United States Patent [19]

Irelan et al.

[11] 4,200,978
[45] May 6, 1980

[54] SHIELD FOR GRASS TRIMMER

[75] Inventors: Edward A. Irelan; Robert L. Bartlett; John W. Walch, all of Columbia, Mo.

[73] Assignee: McGraw-Edison Company, Elgin, Ill.

[21] Appl. No.: 966,879

[22] Filed: Dec. 6, 1978

[51] Int. Cl.$^2$ ............................................. H01G 3/06
[52] U.S. Cl. ......................................... 30/276; 56/12.7
[58] Field of Search .................. 56/12.7, 295; 30/276, 30/347

[56] References Cited

U.S. PATENT DOCUMENTS

| | | | |
|---|---|---|---|
| 3,693,255 | 9/1972 | Langenstein | 30/276 |
| 3,831,278 | 8/1974 | Voglesonger | 30/276 |
| 3,877,146 | 4/1975 | Pittinger | 30/276 |
| 3,959,879 | 6/1976 | Sellers | 30/276 |
| 4,007,526 | 2/1977 | Langenstein | 30/276 |

*Primary Examiner*—Jimmy C. Peters
*Attorney, Agent, or Firm*—Ronald J. LaPorte; Jon Carl Gealow; Dale A. Kubly

[57] ABSTRACT

A grass trimmer includes a housing having a lower base wall from which extends a hub member of a predetermined height coupled to a motor encased in the housing, which motor drives the hub member rotatably. A cutting line element is attached to the hub member. A rim extends outwardly from the housing about the perimeter of the base wall. A first rim portion is of a height greater than the hub member and includes first and second spaced mounting ears extending therefrom toward the hub member. A protective shield designed for mounting on the housing in spaced relation from the base wall, is planar and of a similar shape to the base wall. The shield includes first and second tab and shoulder assemblies located for cooperation with the ears on the rim portion of the housing. Joining the last mentioned assemblies and respective ears attaches the shield to the trimmer housing. A resilient locking lever arm provided on the shield cooperates with a locking rib formed on the rim portion of the housing upon engagement of the tab and shoulder assemblies and mounting ears to removably lock the shield to the housing. The shield prevents the hub member from being driven into the grass during operation of the trimmer, thereby preventing damage to the motor driving the hub member.

An aperture in the protective shield permits easy attachment of cutting line elements to the hub member without removing the shield.

10 Claims, 4 Drawing Figures

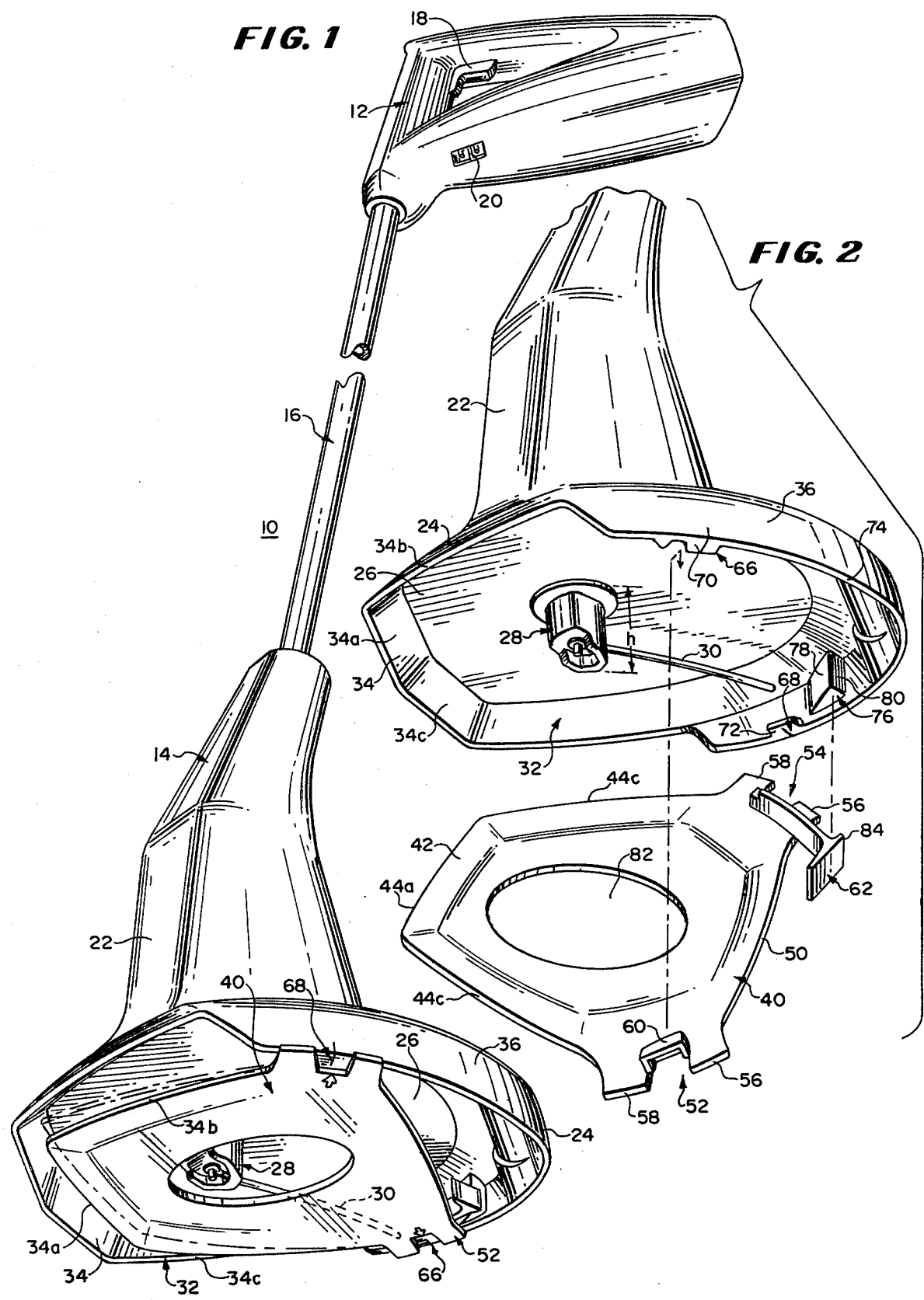

U.S. Patent May 6, 1980 Sheet 2 of 2 4,200,978
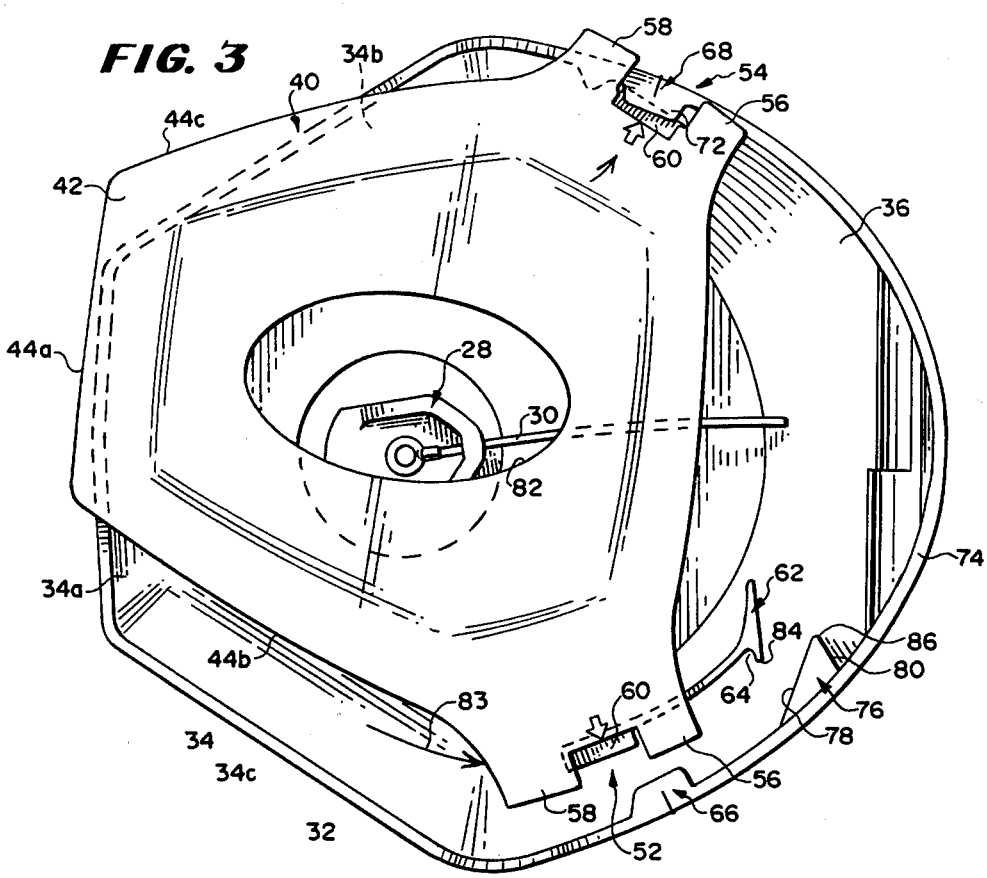
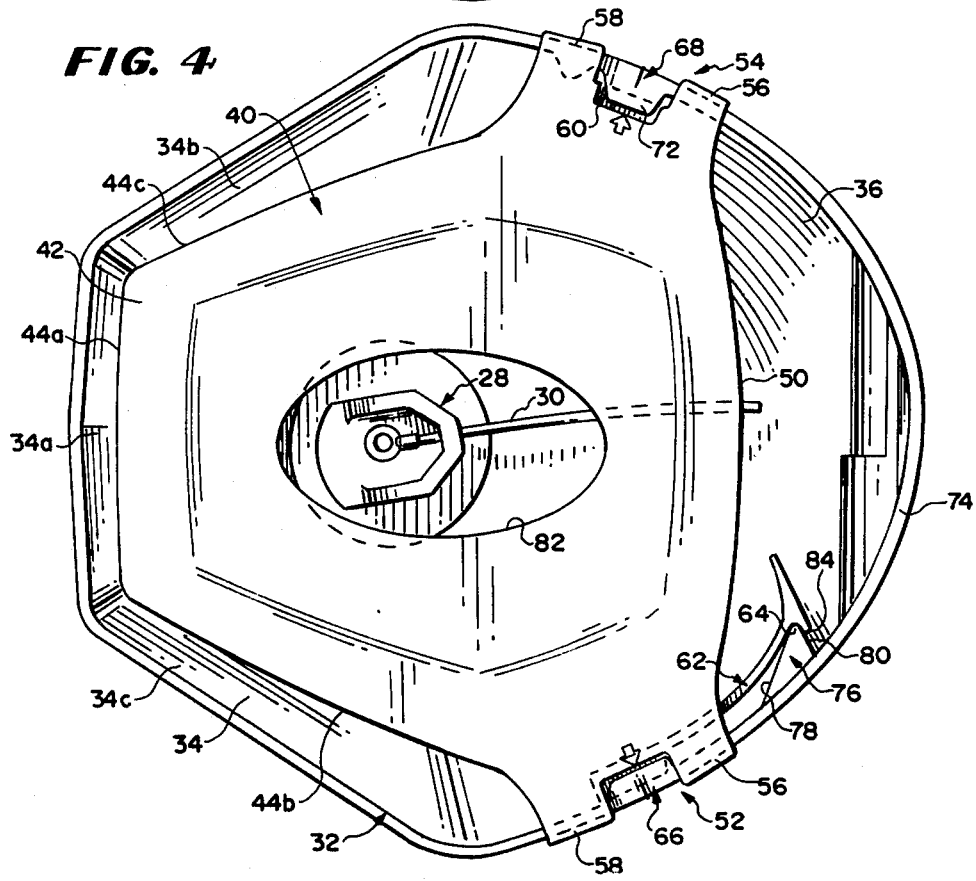

SHIELD FOR GRASS TRIMMER

BACKGROUND OF THE INVENTION

This invention relates generally to grass trimmers of the type employing a plastic or the like cord as a grass cutting element and more particularly to a shield for such trimmers to prevent the slowing of the rotating member to which the cutting element is attached because of friction caused by depressing the member into the ground during operation of the trimmer.

Many prior art grass trimmers using either a metal balde or a plastic cord or the like member as a grass cutting element employ some type of guard or "skid" beneath the cutting element to permit the trimmer to be moved along the ground thereon, or, in the case of a metal blade, to prevent engagement of the operator's feet by the cutting element and/or to prevent scalping of the lawn or grass because of pressing the blade too deeply thereinto. Examples of such guards or skids are shown in U.S. Pat. Nos. 3,959,879; 3,886,716; 3,858,383; 3,664,102; 3,221,481; 2,793,485; 2,597,774; and 2,485,963.

For the most part, the guards or skids illustrated in the aforementioned patents are secured to the motor housing of the grass trimmers and are not designed for easy release and reattachment in the event grass trimmings, etc. become lodged between the guard or "skid" and the base of the trimmer housing. The latter becomes important, especially in the case of battery powered trimmers using plastic cutting elements wherein drag on the motor driving the rotating member to which the cutting element is attached can damage the motor or render the trimmer ineffective and wherein the cutting element must be easily accessible for replacement thereof.

SUMMARY OF THE INVENTION

Accordingly, it is a primary object of the present invention to provide in a grass trimmer of the type employing a plastic or the like cord as the cutting element, a new and improved shield which is easily attachable to and removable from the trimmer housing beneath the rotating member to which the cutting element is attached, which shield prevents the rotating member from being slowed or stopped because of engagement of the member with the ground during the operation of the trimmer and provides access to the cutting element for easy replacement thereof.

It is another object of the present invention to provide a new and improved shield for a grass trimmer of the above-described type which is relatively low in cost, simple in construction and effective in operation.

Briefly, a preferred embodiment of a grass trimmer according to the invention includes a motor housing having a lower end defining a base wall, near the center of which is mounted a rotatably driven hub member to which the cutting line element is attached. The hub member is of a predetermined height, extending outwardly from the base wall perpendicular to the plane thereof. The housing further defines a rim extending outwardly from and about the perimeter of the base wall. The height of a first rim portion is slightly greater than that of the hub member. A second rim portion extending about the remaining portion of the perimeter of the base wall is of a height less than that of the hub member. When using the trimmer, the hub member and the rim of the housing is faced downwardly so that the axis of rotation of the hub member is substantially vertical. The first rim portion of the housing is held toward the operator and the second rim portion is held away from the operator, toward vegetation grass to be trimmed. The cutting line passes between the second rim portion and the ground to cut the grass.

Mounting ears extend inwardly from opposite sides of the first rim portion toward the hub member. A locking rib is provided on the lastmentioned rim portion adjacent one of the ears.

The protective shield for mounting on the housing according to the invention, is generally planar, having a shape similar to that of the lower base wall of the housing. The shield includes, on each side thereof, a tab and shoulder assembly which cooperates with a respective one of the mounting ears on the housing. A resilient locking lever is provided for cooperation with the locking rib for removably locking the shield onto the housing.

To mount the shield on the housing, the former is positioned to align the tab pair thereon opposite the locking lever with the mounting ears on the housing opposite the locking rib. The tabs are positioned on the free edge of the first rim portion of the housing with the shoulder between the tabs being located on the opposite side of the mounting ear. The shield is rotated to move the opposite mounting tabs into a similar cooperating relation with the opposite mounting ear. Rotation of the shield is continued until the locking lever engages the locking rib on the trimmer housing and snaps thereover, thereby removably locking the shield onto the housing. To remove the shield, the locking lever is moved manually away from the locking rib and the tabs are thereafter disengaged from the mounting ears.

When the shield is mounted on the housing, it is separated from the second rim portion to permit the cutting line to extend therebetween for cutting and trimming grass and other vegetation. The shield prevents the hub member from being inadvertently driven into the ground during operation.

In the preferred embodiment of the shield according to the invention, an elliptical aperture is provided therein permitting access to the end of the cutting line element secured to the mounting hub member for easy attachment and removal of the cutting line without removal of the shield.

DESCRIPTION OF THE DRAWINGS

In the drawings:

FIG. 1 is a perspective view of a grass trimmer device employing a plastic or the like cord as the cutting element, including a protective shield mounted on the lower end of the motor housing thereof beneath the cutting element according to the invention;

FIG. 2 is an enlarged, fragmentary, exploded, perspective view of the motor housing of the grass trimmer of FIG. 1 with the protective shield according to the invention separated therefrom; and FIGS. 3 and 4 are bottom plan views of the grass trimmer motor housing portion of FIG. 2 illustrating the manner of attachment and removal of the protective shield with respect thereto.

DETAILED DESCRIPTION OF THE DRAWINGS

Referring now to the drawings in greater detail wherein like numerals have been employed throughout the various views to identify similar components, a grass trimmer designated generally by the numeral 10 is shown in FIG. 1. The grass trimmer includes a handle assembly 12 joined to a motor housing 14 by means of a tubular metal shaft 16. The grass trimmer 10 illustrated in FIG. 1 is of a cordless type, employing rechargeable batteries (not shown) as a power source mounted within the handle housing. The handle housing 12 includes a trigger switch 18 which when depressed energizes an electric motor (not shown) mounted in the motor housing 14. The motor is connected to the switch and batteries via insulated electrical conductors (not shown) passing through the shaft 16. A male connector 20 provided in the handle assembly permits recharging of the batteries mounted therein with a suitable recharging unit of a conventional type (not shown).

The motor housing 14 of the grass trimmer is preferably of a molded plastic construction and includes an upper enclosed portion 22 in which the electric motor employed to drive the cutting line rotatably, is mounted. The lower end portion 24 of the motor housing is bell shaped. Referring to FIG. 2 of the drawings, the lower motor housing end portion 24 of the grass trimmer 10 includes a planar base wall 26 having an aperture (not shown) therein near the center thereof through which the drive shaft (not shown) of the electric motor extends. A hub member 28 to which a nylon, plastic or the like cutting line element 38 is attached, is mounted on the motor drive shaft and is rotated at high speed thereby. The particular cutting element mounting hub and attachment assembly shown is described in copending U.S. patent application, Ser. No. 759,424, filed on Jan. 14, 1977, in the name of R. T. Smith and A. Jacyno, assigned to the same assignee as the subject application. Accordingly, no details of attachment of the cutting element to the rotatable hub member will be provided herein.

The base wall 26 of the motor housing extends generally horizontally during the use of the grass trimmer. The axis of rotation of the hub member to which the nylon cutting line element 30 is attached is perpendicular to the plane of the base wall. The hub member 28 is of a predetermined height "h" as shown in FIG. 2 and extends from the base wall. About the lower base wall 26 of the motor housing there is formed a rim designated generally by the numeral 32. A first rim portion 36 extends outwardly from the base wall 26 a distance slightly greater than the height "h" of the hub member. The first rim portion 36, which is a preferred embodiment of the trimmer 10 shown in the drawings, is arcuate or curved, defines the rear end of the trimmer which when in use is positioned toward the operator. The rim portion 36 is provided to prevent grass trimmings, etc. from being expelled at the rear of the trimmer housing and to prevent the operator's feet from engaging the cutting element.

A second rim portion 34, shown in the preferred embodiment of the trimmer 10 as including an end wall 34a and two side walls 34b, 34c joined between the ends of end wall 34a and the rim portion 36, extends outwardly from the base wall 26, a distance slightly less than the height "h" of the hub member. The second rim portion extends about the remainder of the perimeter of the base wall and defines the front end of the trimmer. When the trimmer is in use the last-mentioned end thereof is placed ahead of the operator, permitting the cutting line to sever vegetation along the walls 34a-c of the second rim portion. The cutting line element extends between the second rim portion 34 and the ground.

It should be understood that in the case of the subject grass trimmer, even if the plastic or nylon cutting line element were to strike the operator's feet, no injury thereto would occur. However, if the latter were to happen, a slowing of the cutting element would occur and inefficient cutting of the vegetation could result. Furthermore, it is possible in the case of the subject grass trimmer that without provision of a protective shield along the bottom wall thereof, an operator may depress the hub member into the vegetation or grass being trimmed, thereby placing sufficient drag on the battery driven electric motor to cause damage thereto. Accordingly, the protective shield 40 according to the invention has been provided to prevent such mishaps.

The protective shield 40, as illustrated in the figures of the drawing, is substantially planar and is formed preferably of a plastic material. The shield is dimensioned similar to, but somewhat smaller, than the base wall 26 of the trimmer housing. One end 42 of the shield is shaped similarly to the rim portion 34 of the housing 22, having a leading edge 44a joined by side edges 44b, 44c, which parallel end walls 34a, 34b and 34c, respectively. The rear edge 50 of the shield is not curved, as is the rim portion 36 of the trimmer housing, but instead is truncated and is spaced from the last-mentioned rim portion. The space provided between the edge 50 of the shield and rim portion 36, permits an operator to easily unlock and remove the shield from the trimmer housing. The latter will be explained in greater detail hereinafter.

Between the rear edge 50 and side edges 44b, 44c respectively, of the shield, there are provided, tab and shoulder assemblies 52, 54 respectively. Each assembly includes first and second spaced tabs 56, 58 formed as extensions of the shield and a shoulder 60 formed therebetween, but offset from the tabs. A resilient locking lever arm 62 is formed integrally with one of the tab and shoulder assemblies 54. The locking lever arm defines a notch 64 at the free end thereof, which as will be described, serves to securely lock the shield to the base of the trimmer housing 22.

The tab assemblies 52, 54 of the protective shield 40 cooperate with mounting ears 66, 68 provided on the rim portion 36. Mounting ears 66, 68 extend inwardly toward the rotatable hub member 28 and parallel to the base wall 26 of the rim housing.

Spaced from mounting ear 66 and extending from the wall surface of the rim portion 36 is a locking rib 76. The locking rib includes an inclined wall 78 facing the mounting ear 66 and a straight wall 80 on the side thereof opposite inclined wall 78. The locking rib cooperates with resilient lever arm 62 to secure the shield to the trimmer housing.

An elliptical aperature-82 defined in the protective shield 40 near the center thereof, permits the removal from, and attachment to rotatable hub member 28 of the length of plastic cutting line 30 without requiring the removal of the protective shield itself.

To attach the protective shield 40 to the lower end of the trimmer housing, tabs 56, 58 of assembly 54 are placed on the edge 74 of rim portion 36 with tabs 56, 58 located on opposite sides of ear 72. Shoulder 60 is located beneath ear 72 as shown in FIG. 3. Once positioned in this fashion, the shield is rotated in the direction of arrow 82 about mounting ear 72, bringing tabs 56, 58 and shoulder 60 of assembly 52 into a relationship with ear 70 similar to that described heretofore with respect to assembly 54 and ear 72. As the shield is rotated, edge 84 (FIG. 3) of the free end of locking lever arm 62 slides along inclined wall 78 of locking rib 76 so that the lever arm is urged away from rib 76 until edge 84 reaches edge 86 of rib 76 formed by the joinder of walls 78, 80 of the rib. At this time, the resilient locking lever arm 62 snaps back toward rim portion 36 so that notch 64 receives edge 86 therein, locking the shield in place on the trimmer housing.

As explained heretofore, once the shield is in place on the trimmer housing, an operator is prevented from driving the rotating hub member 28 into the ground during use of the trimmer, thereby avoiding excessive wear and tear on the battery-powered motor driving the hub member and cutting line.

The shield is easily removable from the trimmer housing. An operator merely presses the locking lever arm 62 toward the shield to remove edge 86 of rib 76 from notch 64. Thereafter, the shield is rotated in the direction opposite arrow 82 to be released. In this manner, easy cleaning of grass, etc. from around the rotating hub member can be accomplished. Changing cutting lines can be accomplished without removal of the shield if desired, through the elliptical opening 82 provided at the center of shield 40.

While a particular embodiment of the invention has been shown and described, it should be understood that the invention is not limited therto since many modifications may be made. It is therefore contemplated to cover by the present application any and all such modifications as fall within the true spirit and scope of the appendage claims.

We claim:

1. A grass trimmer comprising in combination, a housing having a base wall, motor means mounted in said housing, a hub member of a predetermined height extending from the base wall of said housing, a cutting element attached to said hub member and extending radially outwardly therefrom, said hub member being coupled to said motor means and driven rotatably thereby, said housing including a rim extending outwardly from and about the perimeter of said base wall, the height of a first rim portion being greater than the height of said hub member first mounting means provided on said first rim portion and shield means removably mountable on said trimmer housing, said shield means comprising a substantially planar member having a shape similar to that of said base wall and including second mounting means cooperating with said first mounting means and engageable therewith for attachment of said shield to said first rim portion in spaced relation with respect to said base wall with said hub member being interposed between said shield and said base wall, and locking means for removably securing said shield onto said first rim portion, said locking means including a resilient locking lever joined to said shield member, said locking lever defining a notch therein and locking rib means provided on said first rim portion, said locking rib means engaging said locking lever upon engagement of said first and second mounting means, whereby said rib means is received in said notch with a snap action for removably securing said shield member on said trimmer housing.

2. A grass trimmer as claimed in claim 1 wherein the height of a second portion of said rim is less than that of said hub member and wherein said cutting element extends outwardly between said second rim portion and shield for cutting vegetation.

3. A grass trimmer as claimed in claim 1 wherein said first mounting means includes first and second spaced ears, each extending from said first rim portion inwardly therefrom towards said hub member and wherein said second mounting means includes first and second assemblies, each having a pair of spaced tabs extending from said shield substantially along the plane thereof and a shoulder provided between said tabs, but offset from the plane of said tabs, said first and second assemblies cooperating with said first and second ears, respectively, whereby said ears are received between said tabs and engage said shoulder thereby to attach said shield to said trimmer housing.

4. A grass trimmer as claimed in claim 3 wherein said tabs of said first and second mounting means are received on the edge of said first rim portion with said mounting ear extending therebetween, substantially in the plane of said tabs, said shoulder being positioned between said tabs, but offset with respect thereto, in engagement with said mounting ear.

5. A grass trimmer as claimed in claim 1 wherein said locking lever arm includes a free end portion defining said notch therein and wherein said locking rib includes an inclined wall and edge means, said end portion of said locking lever arm being engageable with said inclined wall upon engagement of said first and second mounting means so that said end portion is slidable along said inclined wall to urge said lever arm in a first direction until said notch is aligned with said edge means, whereafter said arm is moved rapidly in the opposite direction to receive said edge means in said notch, thereby securing said shield on said housing.

6. A grass trimmer as claimed in claims 3 and 5 wherein said trimmer housing and shield are of a molded plastic construction and wherein said first and second spaced mounting ears and locking rib are formed integrally with said trimmer housing and wherein said tab and shoulder assemblies and locking lever arm are formed integrally with said shield.

7. A shield for a grass trimmer including a housing having a base wall, a motor mounted in said housing, a hub member of a predetermined height extending from the base wall of said housing, a cutting line element attached to said hub member and extending outwardly therefrom, said hub member being coupled to said motor and driven rotatably thereby, said housing including a rim extending about the perimeter of said base wall, the height of at least a portion of said rim being greater than said hub member and first mounting means and a locking rib mounted on said rim portion, said shield comprising a generally planar member having a shape similar to that of said base wall of said trimmer housing, said member including second mounting means for engagement with said first mounting means on said trimmer housing for attaching said shield to said trimmer housing in spaced relation from said base wall with said hub member interposed therebetween and a resilient locking lever including means for lockingly engaging said locking rib on said trimmer housing upon engagement of said first and second mounting means for removably securing said shield on said trimmer housing.

8. A shield as claimed in claim 7 wherein said second mounting means includes a tab and shoulder assembly including a pair of spaced tabs and a shoulder portion interposed therebetween, offset from said tabs, said first mounting means being received between said tabs in engagement with said shoulder for attaching said shield on said housing and wherein said locking lever defines a notch therein for receipt of said locking rib with a snap action upon engagement of said tab and shoulder assembly and said first mounting means.

9. A shield as claimed in claim 8 wherein said planar member defines an aperture therein through which said hub member is accessible or exchanging cutting line elements, with said shield remaining in place on said trimmer housing.

10. A shield as claimed in claim 8 wherein said planar shield member is separated from said rim portion along a first edge of said member and wherein said locking lever extends between said first edge of said member and said rim portion in the space defined therebetween and is accessible for manual disengagement of said locking lever and said locking rib, thereby to remove said member from said housing.

* * * * *